(12) United States Patent
Nacif Benavides

(10) Patent No.: US 11,134,734 B2
(45) Date of Patent: Oct. 5, 2021

(54) GARMENTS HAVING MUSCLE ENHANCEMENT DEVICE AND METHOD OF THE MAKING THE SAME

(71) Applicant: Rounderbum LLC., West Hollywood, CA (US)

(72) Inventor: Jamil Nacif Benavides, Mexico City (MX)

(73) Assignee: Rounderbum LLC

( * ) Notice: Subject to any disclaimer, the term of this patent is extended or adjusted under 35 U.S.C. 154(b) by 298 days.

(21) Appl. No.: 16/125,777

(22) Filed: Sep. 10, 2018

(65) Prior Publication Data
US 2019/0075867 A1   Mar. 14, 2019

Related U.S. Application Data

(60) Provisional application No. 62/556,499, filed on Sep. 10, 2017.

(51) Int. Cl.
| | |
|---|---|
| A41D 27/26 | (2006.01) |
| A41B 9/00 | (2006.01) |
| A41B 17/00 | (2006.01) |
| A41B 1/08 | (2006.01) |
| B26D 3/00 | (2006.01) |
| B23D 61/12 | (2006.01) |
| A41D 31/00 | (2019.01) |

(52) U.S. Cl.
CPC ............... *A41D 27/26* (2013.01); *A41B 1/08* (2013.01); *A41B 9/001* (2013.01); *A41B 17/00* (2013.01); *A41D 31/00* (2013.01); *B23D 61/121* (2013.01); *B26D 3/006* (2013.01); *A41B 2400/38* (2013.01); *A41D 2400/38* (2013.01)

(58) Field of Classification Search
CPC .......................... A41D 27/26; A41D 2400/38; A41B 2400/38; A41C 3/144
See application file for complete search history.

(56) References Cited

U.S. PATENT DOCUMENTS

| | | | | |
|---|---|---|---|---|
| 2,419,830 A | * | 4/1947 | Freeman ................ | A41D 27/26 2/268 |
| 2,574,637 A | * | 11/1951 | Gerry ..................... | A41D 27/26 2/268 |
| 2,638,603 A | * | 5/1953 | Riedler .................. | A41D 27/26 2/268 |
| 3,502,083 A | * | 3/1970 | Howard ................. | A41C 3/144 450/92 |
| 4,025,597 A | * | 5/1977 | Sawamoto ............. | A41C 5/005 264/138 |
| 4,250,137 A | * | 2/1981 | Riedler .................. | A41C 5/005 264/321 |
| 4,807,301 A | | 2/1989 | Ferber | |
| 4,969,216 A | | 11/1990 | Guelli | |
| 5,426,786 A | | 6/1995 | Calvin | |
| D387,538 S | | 12/1997 | Taylor | |
| 5,749,101 A | | 5/1998 | Breindel | |

(Continued)

*Primary Examiner* — Tajash D Patel
(74) *Attorney, Agent, or Firm* — Treasure IP Group, LLC

(57) ABSTRACT

The present invention describes a muscle enhancement device comprises a pad sandwiched between two pieces of fabric. The pad is surround by a transitional edge. When muscle enhancement device is being worn properly, the muscle enhancement device is changed from a relaxed state to a stretched state and pad provides a soft, comfortable diffused and obscure edge.

8 Claims, 15 Drawing Sheets

(56) References Cited

U.S. PATENT DOCUMENTS

| | | | |
|---|---|---|---|
| 5,842,232 A | | 12/1998 | Parrish |
| 5,843,062 A | * | 12/1998 | Reidmiller ............ A61F 13/141 |
| | | | 604/378 |
| 6,182,297 B1 | | 2/2001 | Duren |
| D481,192 S | | 10/2003 | Davis |
| 6,988,931 B1 | * | 1/2006 | Martinet ................ A41C 3/144 |
| | | | 2/267 |
| 7,089,601 B2 | | 8/2006 | Chen |
| D540,009 S | | 4/2007 | Ceffalio |
| D551,428 S | | 9/2007 | Woo |
| D585,182 S | | 1/2009 | Hodges |
| D646,047 S | | 10/2011 | Arensdorf |
| 8,235,766 B2 | | 8/2012 | Melarti |
| 8,336,121 B2 | | 12/2012 | Martz |
| D698,118 S | | 1/2014 | Denning |
| D712,631 S | | 9/2014 | Trassiev |
| D722,261 S | | 2/2015 | Myers et al. |
| D765,344 S | | 9/2016 | McArthur et al. |
| D770,126 S | | 11/2016 | McArthur et al. |
| 2005/0208875 A1 | * | 9/2005 | Jagaric .................... A41C 3/10 |
| | | | 450/39 |
| 2010/0064409 A1 | | 3/2010 | Buckley |
| 2012/0045966 A1 | * | 2/2012 | Zhang ................... A41C 3/144 |
| | | | 450/57 |
| 2012/0216337 A1 | | 8/2012 | Nelson |
| 2016/0353806 A1 | | 12/2016 | Carlos |

\* cited by examiner

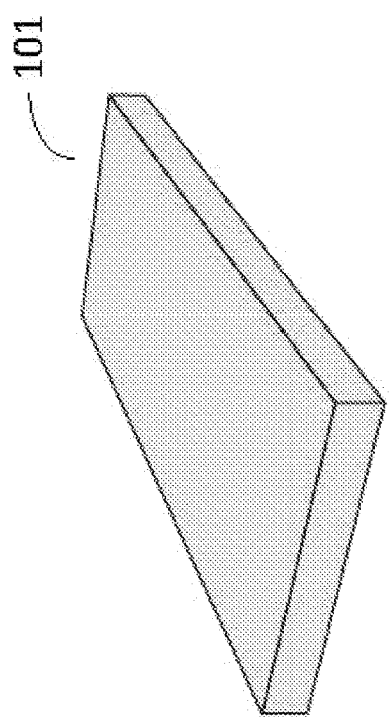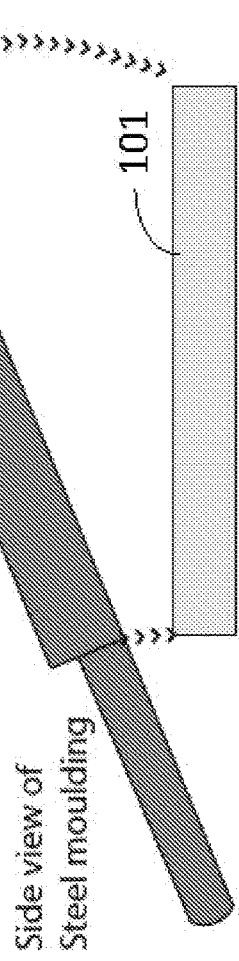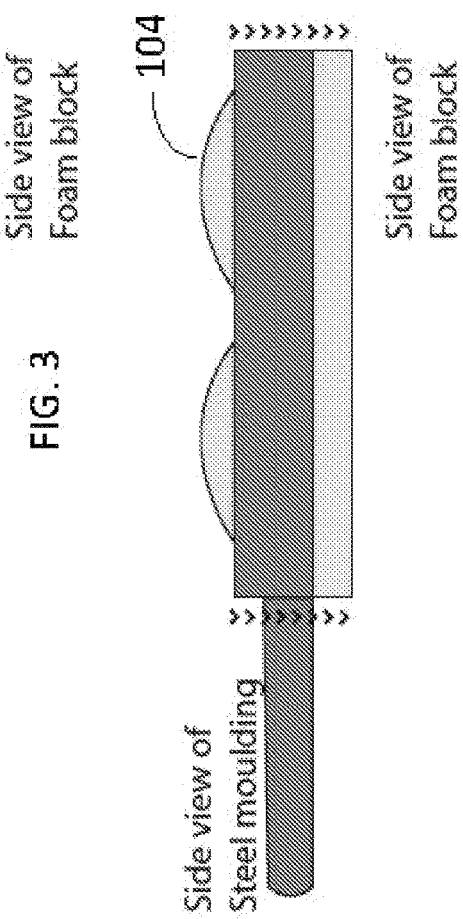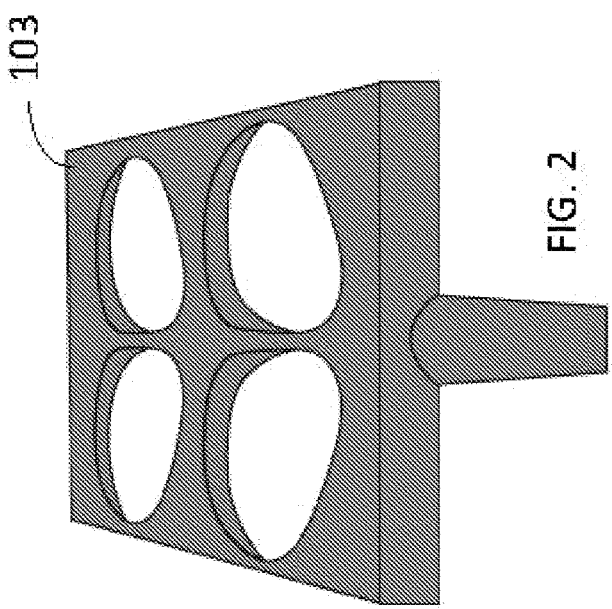

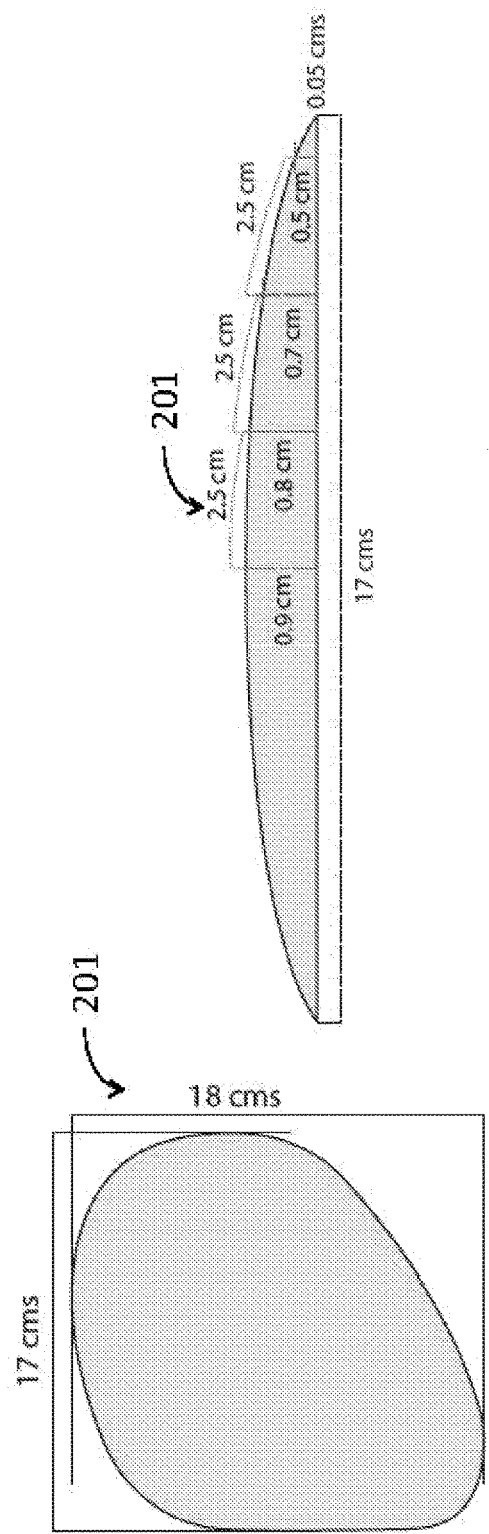
FIG. 7
FIG. 6
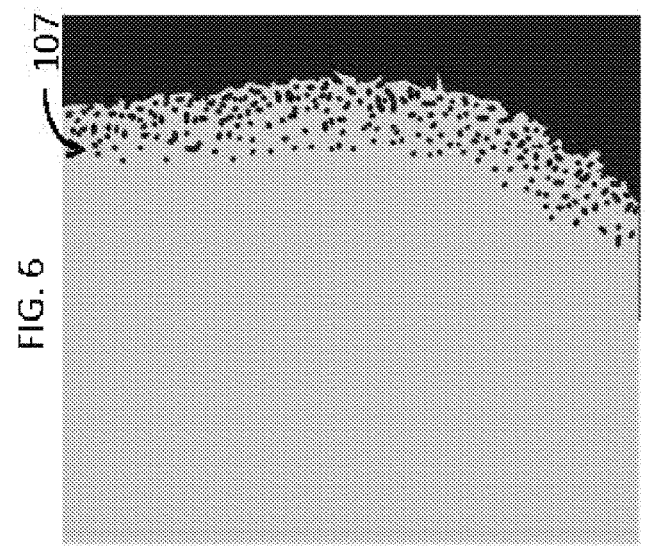
FIG. 8
6) Microscopic view

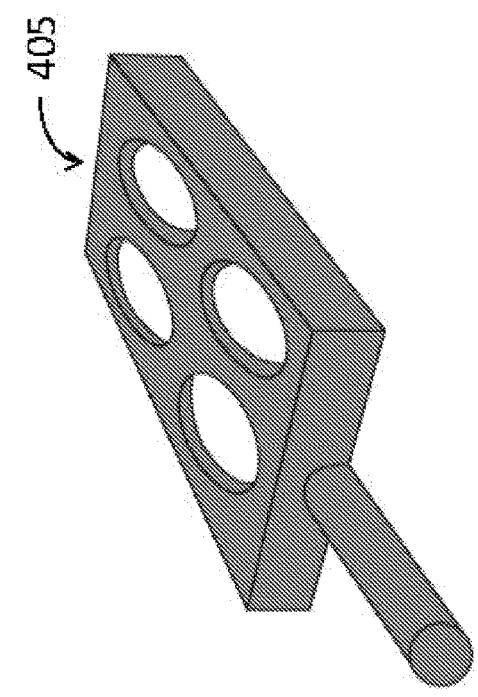
FIG. 9
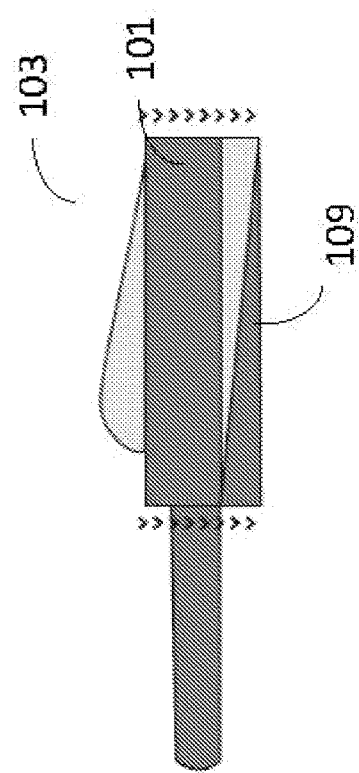
FIG. 10
FIG. 12
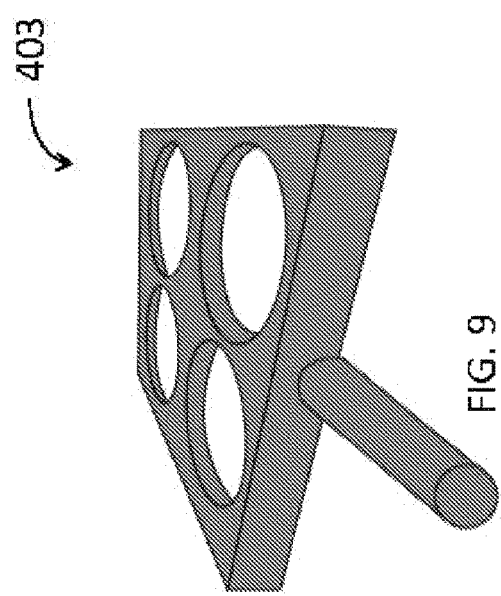
FIG. 11

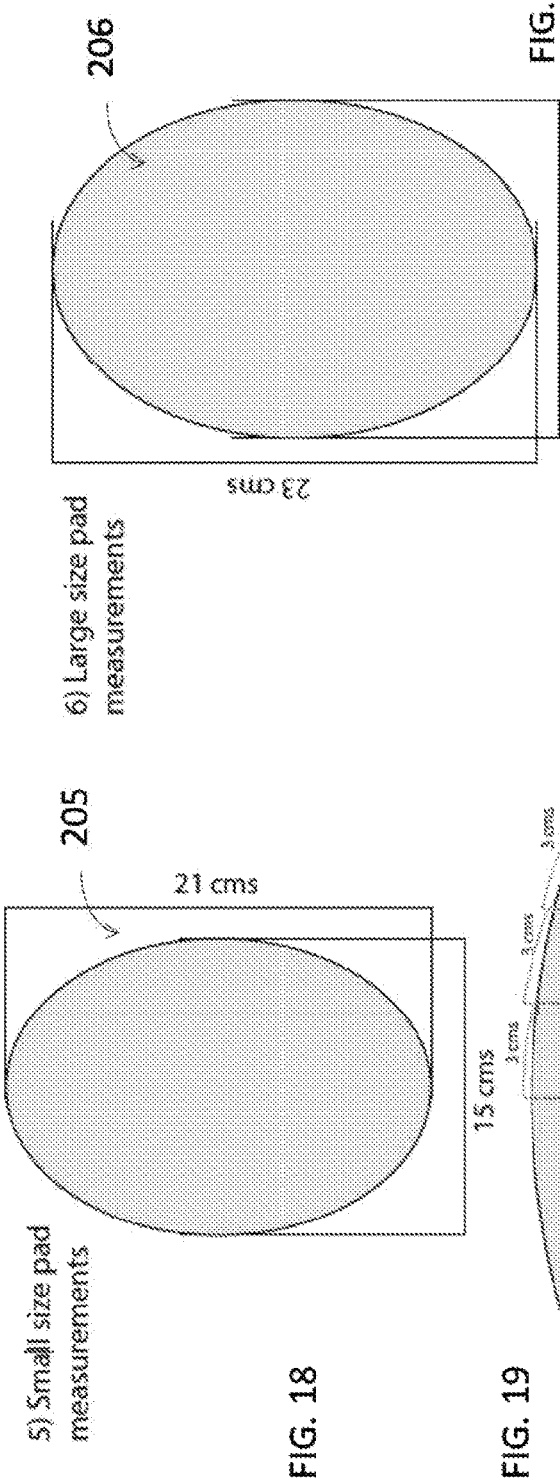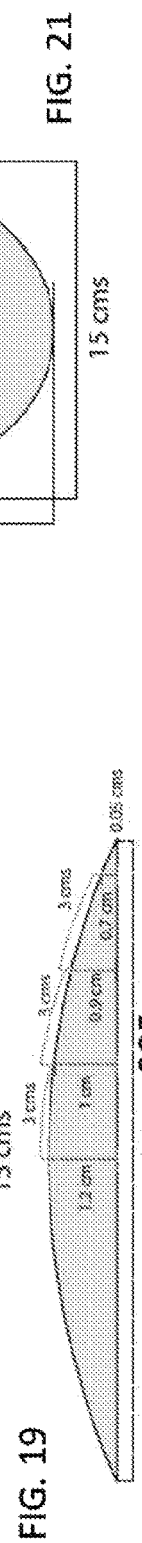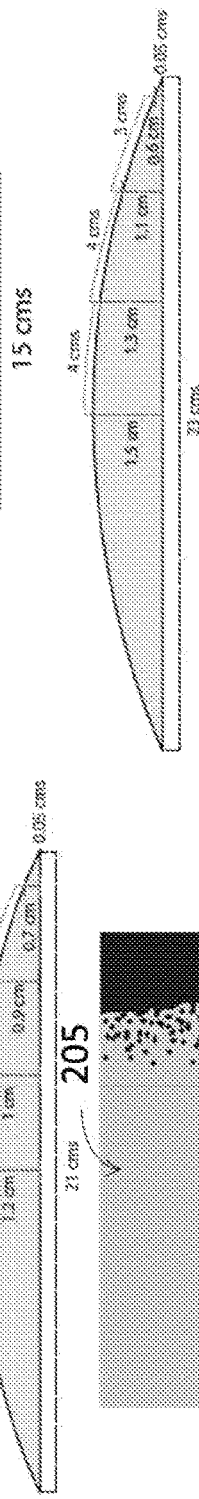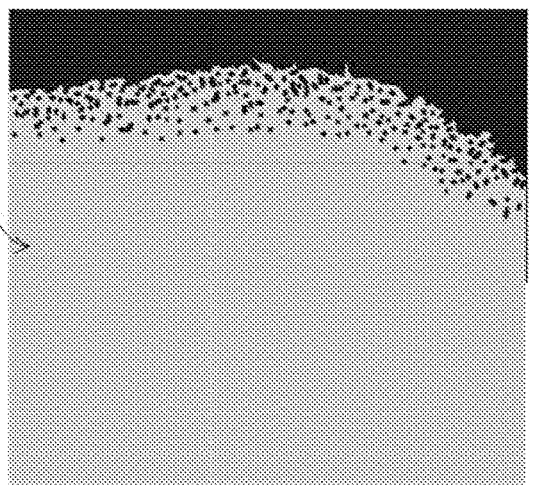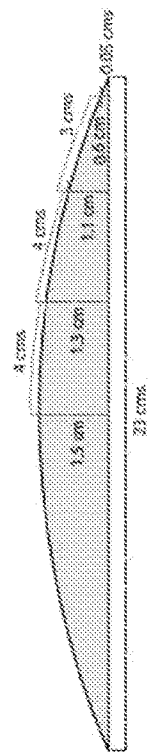
FIG. 18  
5) Small size pad measurements
FIG. 19
FIG. 20  
7) Microscopic view of edge on pad showing zero edge effect
FIG. 21  
6) Large size pad measurements
FIG. 22

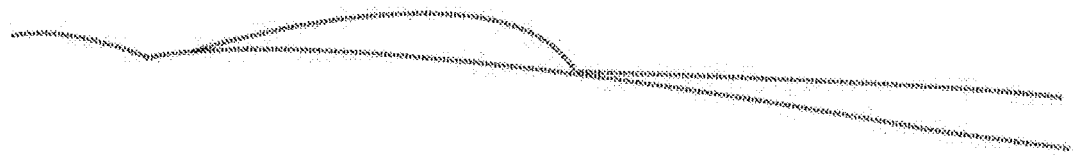
FIG. 36
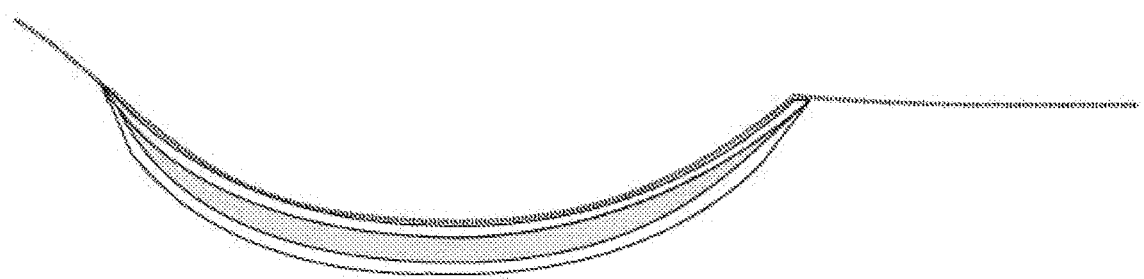
FIG. 35
FIG. 34

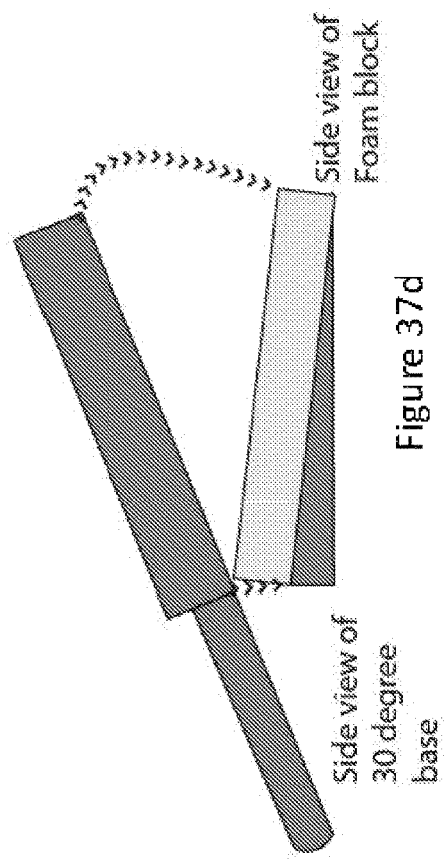

4) 30 degree steel base is placed under the polyurethane foam, the steel moulding is pressed over them until the foam pops out to the surface on desired asymmetric shape.

Side view of 30 degree base

Side view of Foam block

Figure 37d

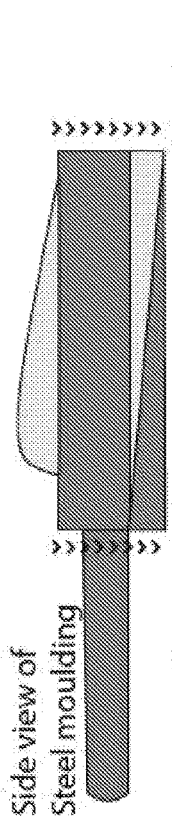

Side view of Steel moulding

Side view of 30 degree base

Side view of Foam block

Figure 37e

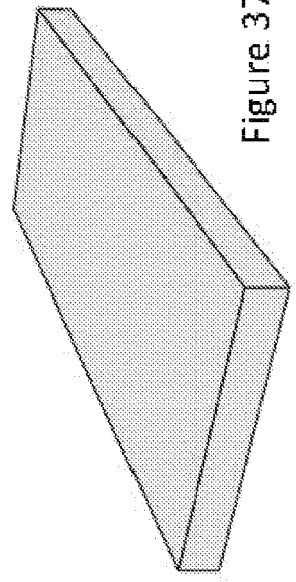

1) Block of Polyurethane Foam

Figure 37a

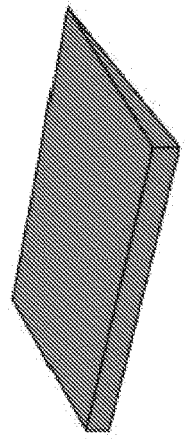

2) 30 degree inclination steel base for asymmetric cut.

Figure 37b

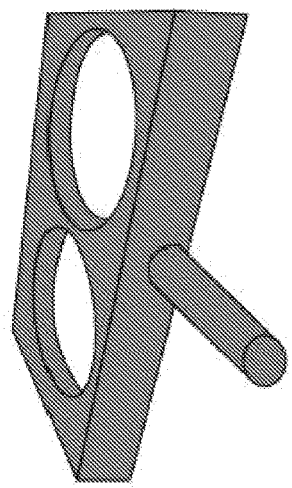

3) Steel moulding with the shape of rounded pads

Figure 37c

1) Pads percentage increase/decrease once it's being worn

From +3% to +4% on lenght

From -9% to -10% on height

1) Pad measurements laying flat

Lenght 16.5 cms

Height 16 cm

Weight: 3.2265 grs

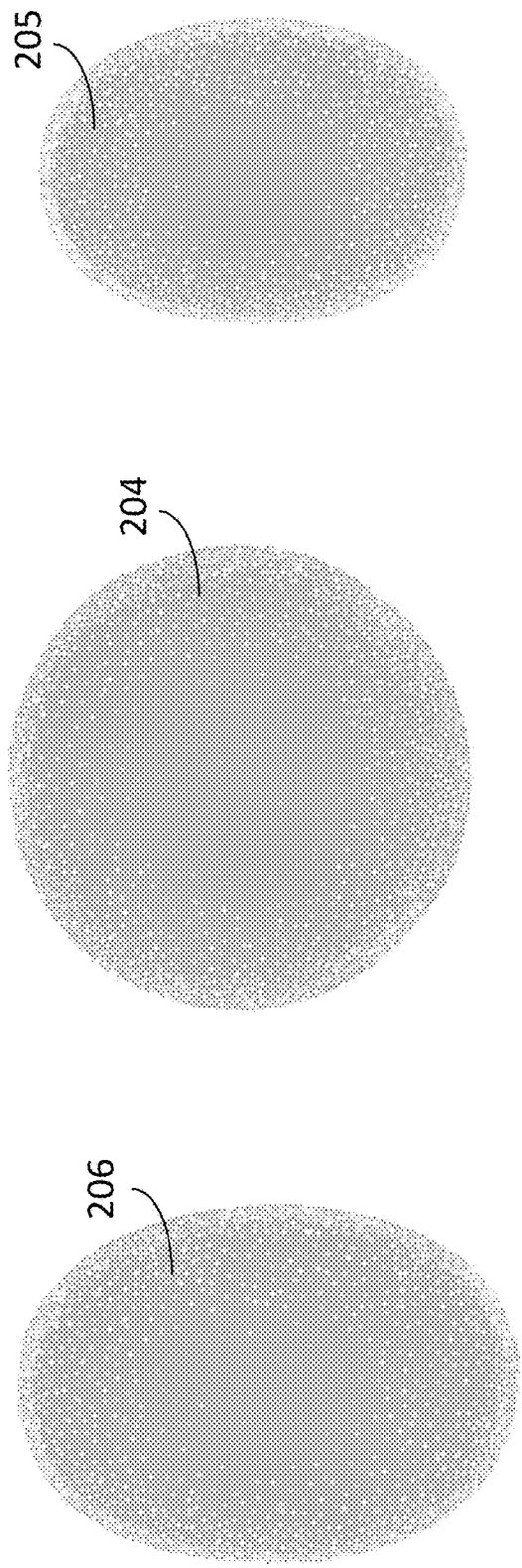
Figure 42
Figure 43
Figure 44
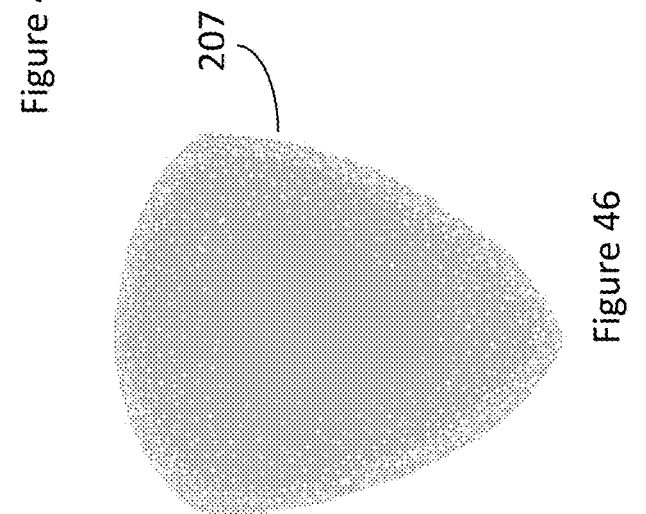
Figure 46
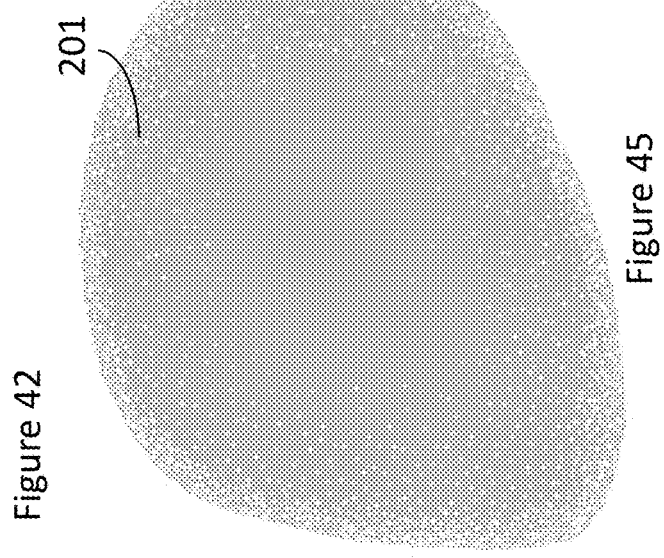
Figure 45

Angle 1: 9.4°

Angle 1: 7.15°.
Angle 2: 10.45°.

GARMENTS HAVING MUSCLE ENHANCEMENT DEVICE AND METHOD OF THE MAKING THE SAME

CROSS-REFERENCE TO RELATED APPLICATIONS

This application takes priority from a provisional application 62/556,499, filed on Sep. 10, 2017. The provisional application is enclose herein in its entirety.

FIELD OF INVENTION

The present invention is related to a device for improving the volume and shape of a wearer's body. The muscle enhancement device is soft flexible including the edges, and is configured to supplement or add on to the existing body shape rather than change or correct a body shape.

BACKGROUND

Having a nice physique is what people desire most. Sex appeal has always been measured by the curves and body shape people have, more specifically, the body parts and/or muscles that are lacking or insufficient in shape or mass. Proper exercise and body lifting can increase the size of the musculature; however, a large amount of weight is necessary to stimulate muscle hypertrophy, leading to injury in many cases. Other methods such as implants used in plastic surgery, are costly, have serious health implications and a high risk of rejection.

Quick alternatives to enhance the physique have been achieved through padded garments that temporarily add volume to the physical appearance of the wearer. For centuries, women have always had their ways of enhancing the shape of their bodies. Nowadays, the clothing industry has evolved and even men seek easier alternatives to enhance their physique too. For years, padding material has been used to easily add volume to different body areas but it always appears noticeable or artificial because the existence of the pads can be seen due to pronounced hard edges. No matter how thinned out the pads are, they are always visible due to the traditional thermoforming process padding material is manufactured with.

Therefore the need to provide an easy, comfortable and low cost method to enhance a person's body, without being noticeable or perceived as artificial.

SUMMARY OF THE INVENTION

The present invention discloses a muscle enhancement device comprises a pad sandwiched between two pieces of fabric. The pad is surrounded by a transitional edge. When muscle enhancement device is being worn properly, the muscle enhancement device is changed from a relaxed state to a stretched state and pad provides a soft, comfortable and diffused edge.

It is one object of the present invention, to provide a garment system which is comfortable to wear. The garment system having the muscle enhancement device of the present invention is light weighted, flexible and having soft and comfortable edges.

It is another object of the present invention, to provide a garment system which offers very natural enhanced appearance. The garment system having the muscle enhancement device of the present invention, when worn properly, it does not have a visible or pronounced edges, leaving the pad hard to be identified.

It is another object of the present invention, to provide a garment system is easy and low cost to be manufactured. The garment system having the muscle enhancement device of the present invention, can be made in a batch process and easy to make. Further manufacturing process is very versatile, allowing different shapes of the pads to be made easily.

In a first aspect of the present invention, a novel pad is disclosed. In one embodiment, the pad has a transitional edge. In another embodiment, the pad is changed from a relaxed state to a tension state when the pad is fixed to a person's body properly.

In a second aspect of the present invention, a muscle enhancement device using the novel pad is disclosed. In one embodiment, described herein, muscle enhancement device consists essentially of one piece of pad sandwiched between two pieces of fabric. In one embodiment, when the fabric is stretched, the pad is compressed to a first tension state. In another embodiment, when the fabric is stretched, the pad is elongated. The fabric is made of cotton (80-95%) and elastane (20-5%).

In a third aspect of the present invention, a method to make the pad is disclosed. The method comprises providing a piece polymer foam, a mold having a cavity in a first shape; pressing the mold on to the polymer foam and applying pressure; form a pad in the first shape when the foam emerges through the cavity of the mold; and cutting off the pad in the first shape along a flat surface of the mold using a saw.

BRIEF DESCRIPTION OF THE DRAWINGS

FIG. 1 is a schematic illustration of the foam, in accordance with the aspects of the present invention;

FIG. 2 is a schematic illustration of the mold or template, in accordance with the aspects of the present invention;

FIG. 3 is a schematic illustration of a process placing the mold on top of the foam;

FIG. 4 is a schematic illustration of forming pads in the mold in accordance with the aspects of the present invention;

FIG. 6 is a schematic illustration of a chest pad, in accordance with the aspects of the present invention;

FIG. 7 is a schematic illustration of a cross sectional view of the chest pad in FIG. 6, in accordance with the aspects of the present invention;

FIG. 8 is a microscopic view of the chest pad in FIG. 6, in accordance with the aspects of the present invention;

FIG. 9 is a schematic illustration of a mold configured to make round pads, in accordance with the aspects of the present invention;

FIG. 10 is a schematic illustration of a mold configured to make oval pads, in accordance with the aspects of the present invention;

FIG. 11 is a schematic illustration of a mold configured to make irregular Escutcheon shaped pads, in accordance with the aspects of the present invention;

FIG. 12 is a schematic illustration of a process to make uneven or asymmetric pad with an additional base, in accordance with the aspects of the present invention;

FIG. 18 is a schematic illustration of a first oval pad, in accordance with the aspects of the present invention;

FIG. 19 is a schematic illustration of a cross sectional view of the first oval pad in FIG. 18, in accordance with the aspects of the present invention;

FIG. 20 is a microscopic view of the first oval pad in FIG. 18, in accordance with the aspects of the present invention;

FIG. 21 is a schematic illustration of a second oval pad, in accordance with the aspects of the present invention;

FIG. 22 is a schematic illustration of a cross sectional view of the second oval pad in FIG. 21, in accordance with the aspects of the present invention;

FIG. 34 is a schematic illustration of a pad sandwiched between two pieces of fabric, the fabric is in a relaxed state;

FIG. 35 is a schematic illustration of the pad sandwiched between two pieces of fabric of FIG. 34, and the fabric is in a tension state and/or stretched state;

FIG. 36 is a schematic illustration of the pad in FIG. 35 when it is being worn;

FIGS. 37a-e illustrate a process to make asymmetric pad by using additional support;

FIGS. 42-46 are exemplar microscopic images of the pads, these images are the same images as in FIGS. 8, 15, 20 and 25 except the images are on grey and white scale;

DETAILED DESCRIPTION OF EMBODIMENTS

Figure 5:
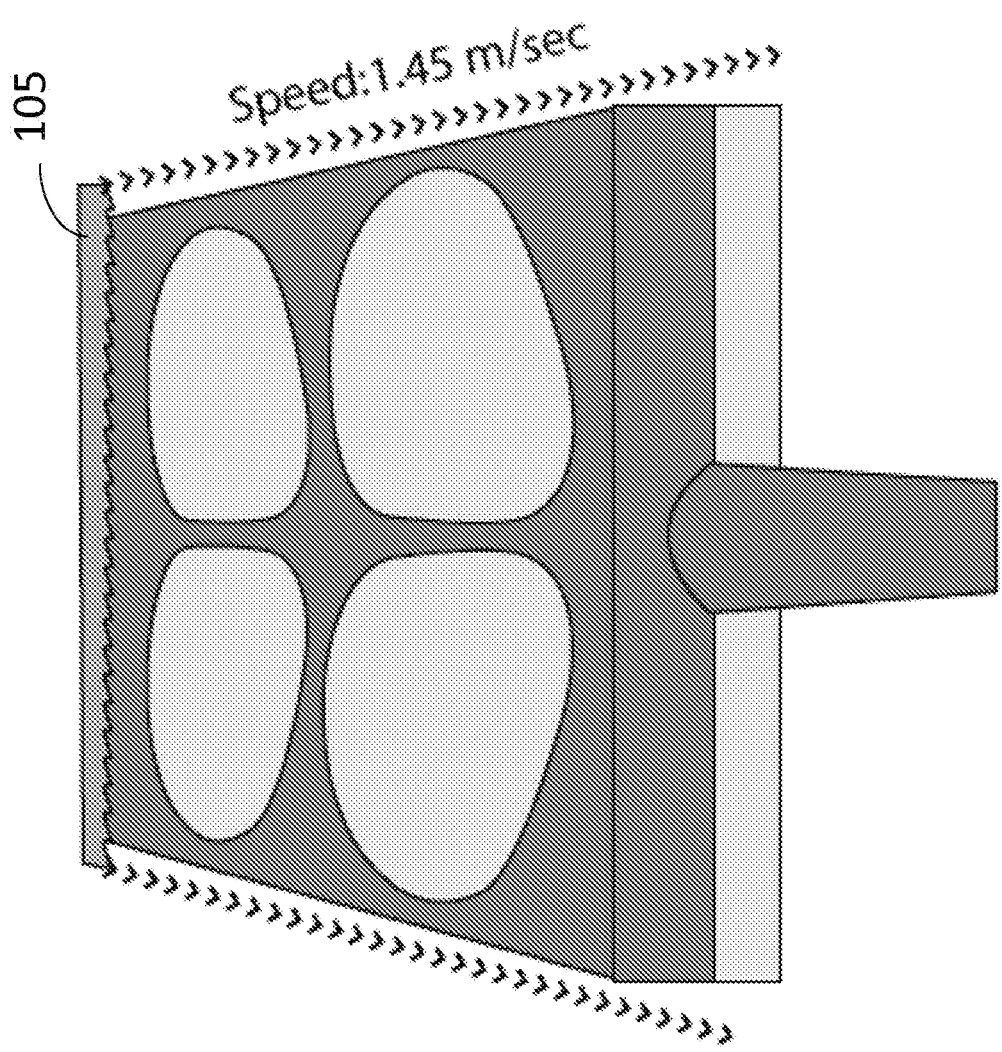
FIG. 5 is a schematic illustration of cutting the pads in accordance with the aspects of the present invention.
Figure 13:
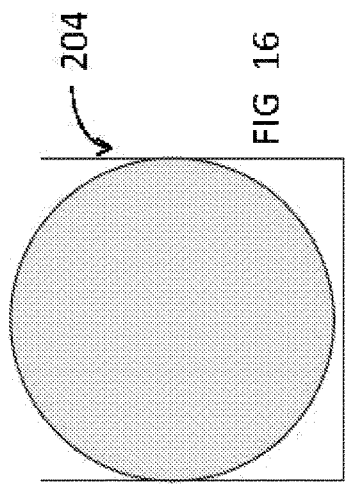
FIG. 13 is a schematic illustration of a first round pad, in accordance with the aspects of the present invention.
Figure 14:
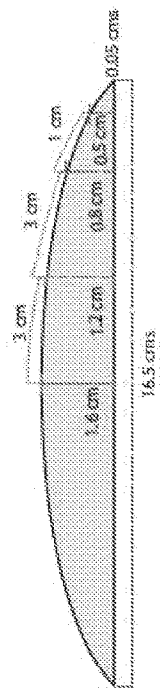
FIG. 14 is a schematic illustration of a cross sectional view of the first round pad in FIG. 13, in accordance with the aspects of the present invention.
Figure 15:
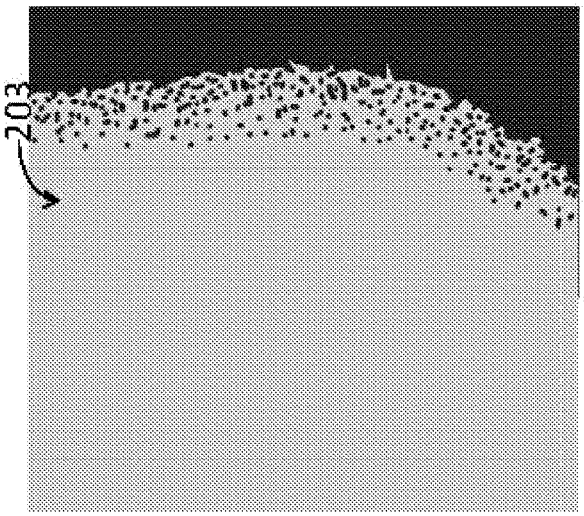
FIG. 15 is a microscopic view of the first round pad in FIG. 13, in accordance with the aspects of the present invention.
Figure 16:
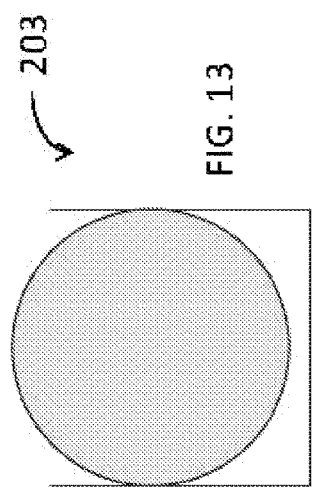
FIG. 16 is a schematic illustration of a second round pad, in accordance with the aspects of the present invention.
Figure 17:
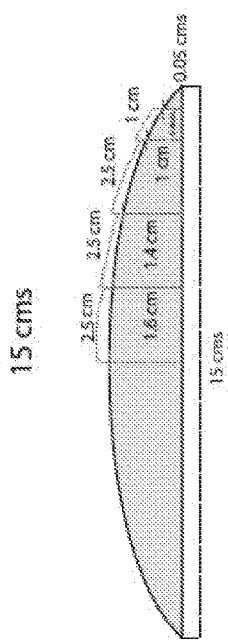
FIG. 17 is a schematic illustration of a cross sectional view of the second round pad in FIG. 16, in accordance with the aspects of the present invention.
Figure 24:
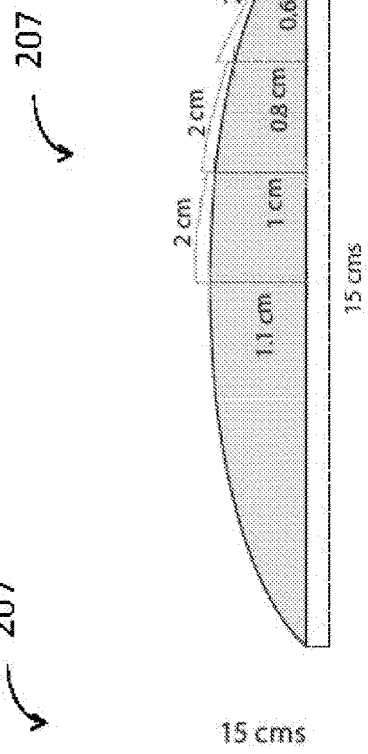
FIG. 24 is a schematic illustration of a cross sectional view of the irregular triangle shaped pad in FIG. 23, in accordance with the aspects of the present invention.
Figure 23:
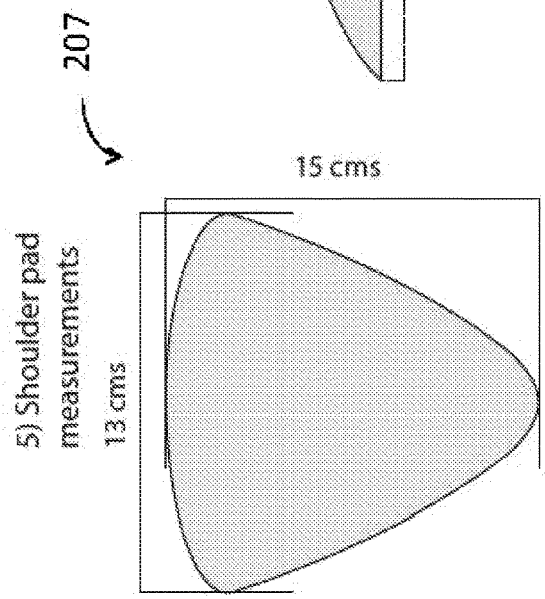
FIG. 23 is a schematic illustration of an irregular triangle shaped pad, in accordance with the aspects of the present invention.
Figure 25:
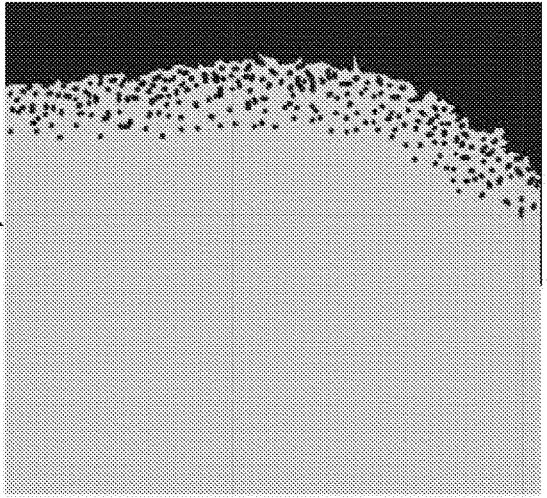
FIG. 25 is a microscopic view of the irregular triangle shaped pad in FIG. 23, in accordance with the aspects of the present invention.
Figure 26:
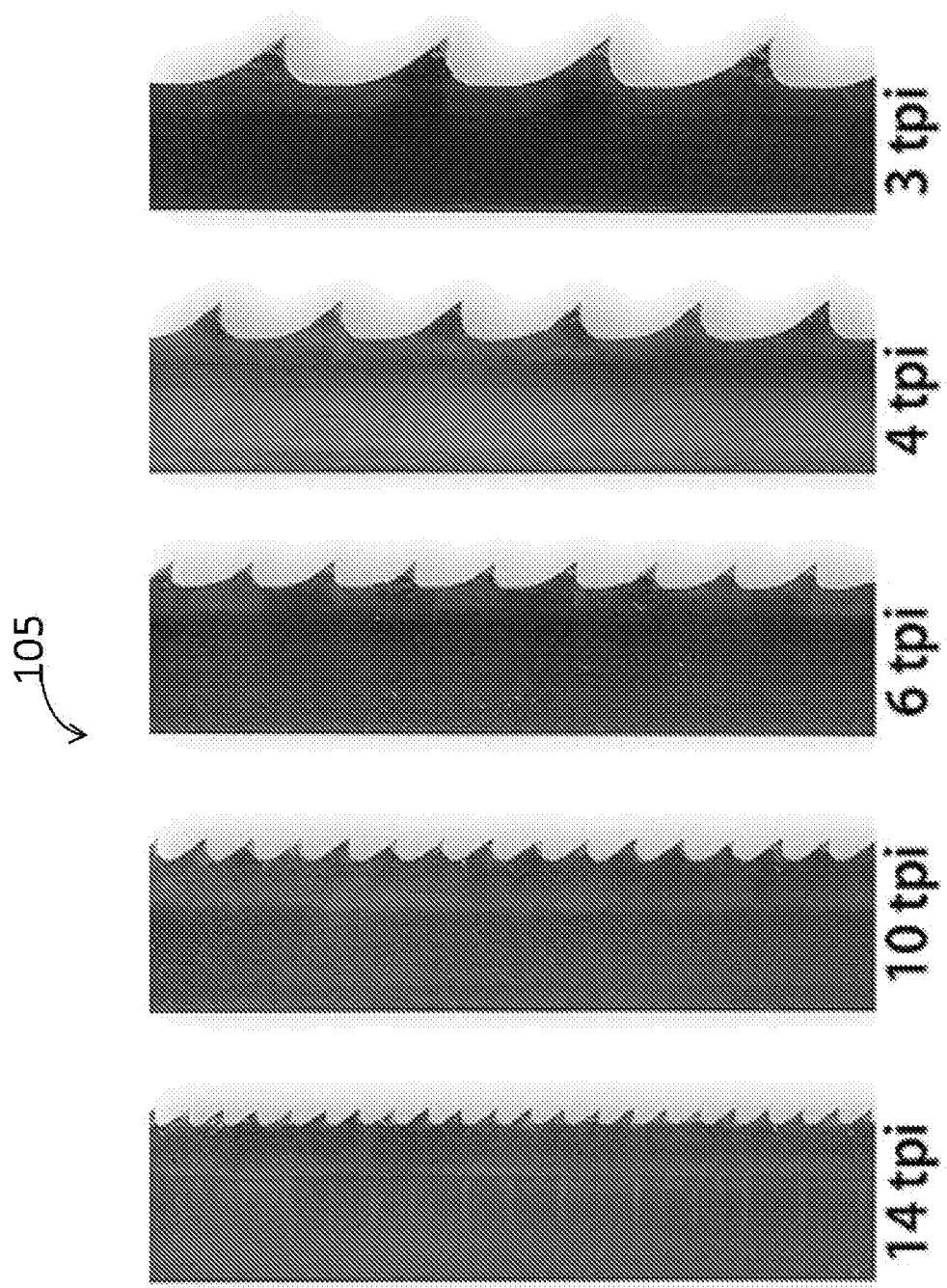
FIG. 26 is a schematic illustration of different saws.
Figure 28:
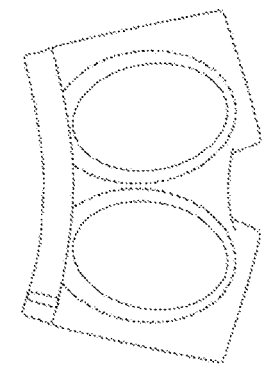
FIG. 28 is a back view of a padded underwear not being worn, showing the inside surface out.
Figure 30:
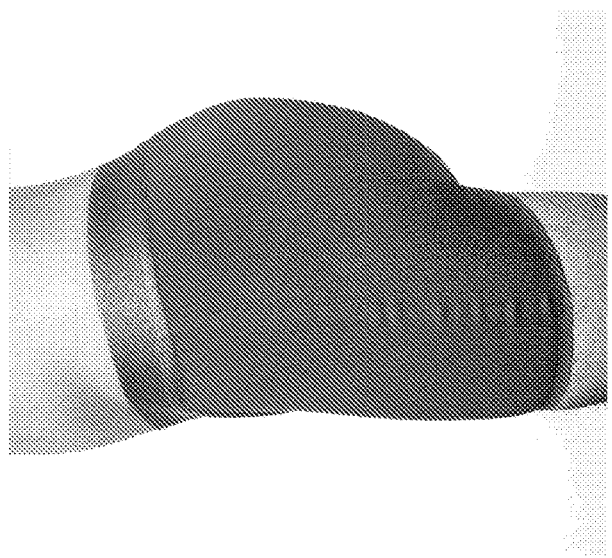
FIG. 30 is a side view of a padded underwear being worn, showing the outside surface, wherein the padding edge can not be clearly indentified.
Figure 27:
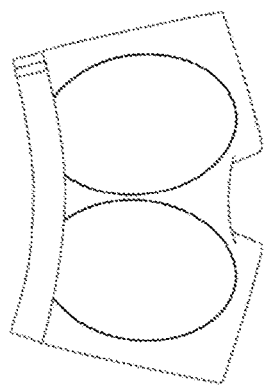
FIG. 27 is a back view of a padded underwear not being worn, showing the outside surface.
Figure 29:
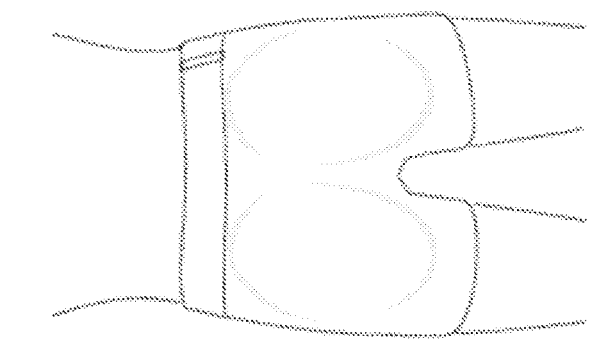
FIG. 29 is a back view of a padded underwear being worn, showing the outside surface, wherein the padding edge are diffused.
Figure 33:
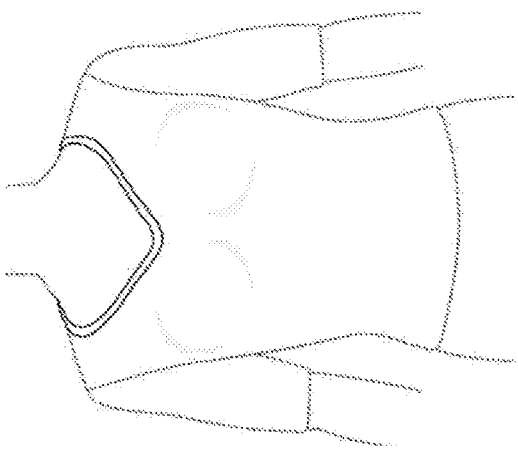
FIG. 33 is a back view of a padded chest shirt being worn, showing the outside surface, wherein the padding edge are diffused.
Figure 32:
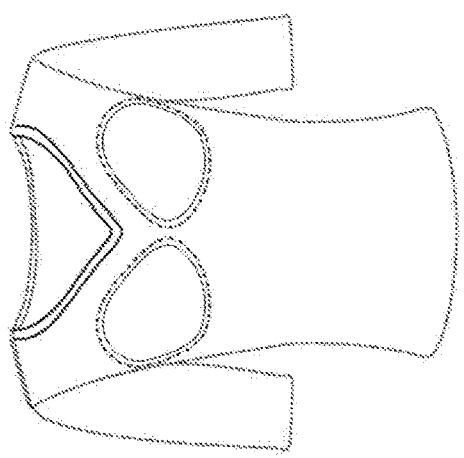
FIG. 32 is a front view of a padded chest shirt not being worn, showing the inside surface out.
Figure 31:
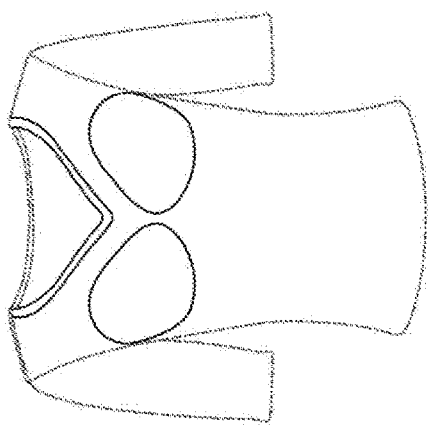
FIG. 31 is a front view of a padded chest shirt not being worn, showing the outside surface.
Figure 40:
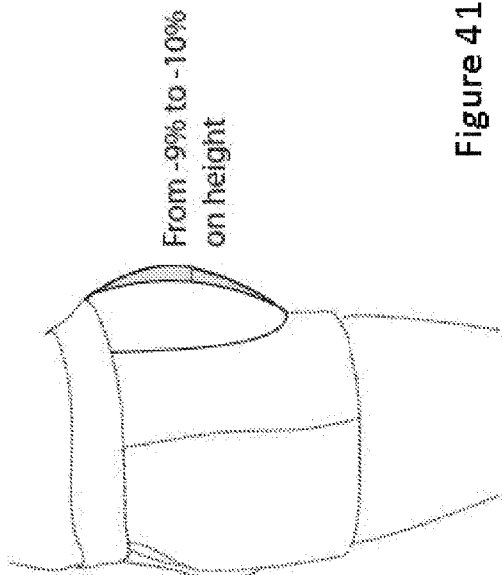
FIG. 40 shows the exemplar round pad after being worn its diameter or length has increased by 3-4%.
Figure 41:
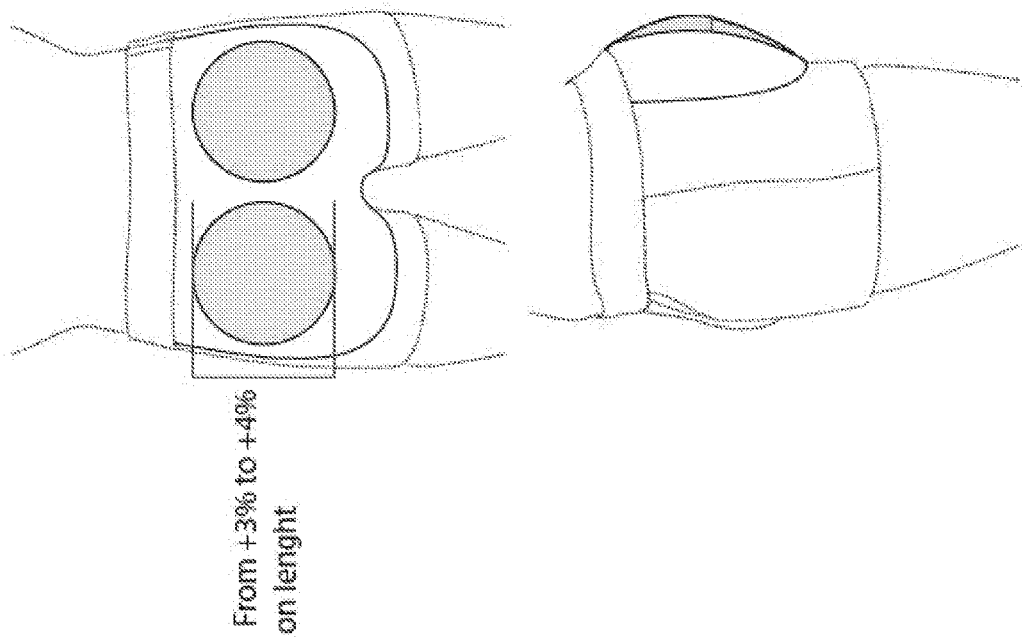
FIG. 41 shows the exemplar round pad after being worn its height or thickness has reduced by 9-10%.
Figure 38:
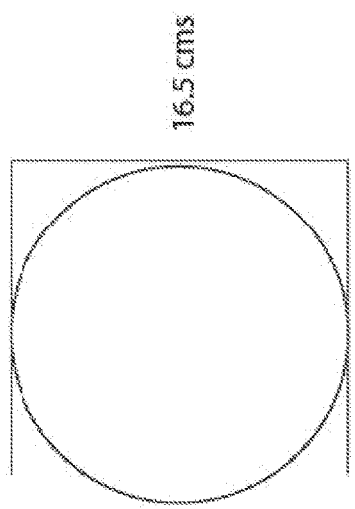
FIG. 38 shows an exemplar round pad and how the its diameter is being measured.
Figure 39:
FIG. 39 shows the exemplar round pad in FIG. 38 and how the its height is being measured.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The structure and function of a novel pad and the muscle enhancement device and method of making the same is described in detail below. Elements in the drawings are:

101 base foam
    103 template
    104 top of a pad
    105 saw
    107 transitional edge
    109 additional base, or solid support
    201 an irregular rectangular pad
    203 a first round pad
    204 a second round pad
    205 a first oval pad
    206 a second oval pad
    207 an irregular triangular pad or irregular Escutcheon shaped pad
    403 a mold template to make round pad
    405 a mold template to make oval pad
    407 a mold template to make irregular triangular pad Pad Composition The pad is made of a polymer foam. In one embodiment, the polymer foam is a flexible and porous polyurethane foam.

In one example, the polyurethane foam has a density at 18.53 kg/m$^3$, can bear force to tension at least 14.23 lb/in$^2$, elongation is at least 223.4%, tear at least 2.03 lb/in, ILD 20% is at least 38.95 lb/50 pulg$^2$ and ILD 65% is at least 57.8 lb/50 pulg$^2$, measured by a ASTM D3574 testing method.

Pad Shapes

In accordance with aspects of the present invention, the pad disclosed herein can be made into a broad variety of shapes, including an irregular rectangular pad configured to be used as a chest pad, a round pad configured to be used as a posterior pad, an oval pad configured to be used as a posterior pad, an irregular Escutcheon shaped pad configured to be used as a shoulder pad, an irregular triangular pad configured to be used as an arm pad.

The manufacturing process offered by the present invention, has the versatility to make pads at different shape and dimension easily. Therefore, in a muscle enhancement device, only one pad is used instead of two or more pieces' posterior-form pads, like in U.S. Pat. No. 7,704,120, are needed to achieve an optimal effect.

Pad Dimension

The pad in the present invention is 3D dimensional pad, a cross-sectional view for each exemplar pad is illustrated in the figures, wherein the cross-sectional view for each exemplar pad going through a center of the pad. In one example, the center is either a geometric center of the pad. In another example, the center is a thickest position of the pad.

Reference to the Figures, wherein the cross-sectional view of each pad having a length and a height. The length for different pads is between 14-25 cm. The height for different pads is between 0.8-1.6 cm.

The overall goal of the present invention, is to deliver a natural, real look when the muscle enhancement device is fixed to a human body. Therefore the dimensions of the pads, especially of the thickness of the pads are carefully calculated, tested and defined as between 0.8-1.6 cm when it is made at a relaxed state. So that when the pad is made into a muscle enhancement device, being worn, the pad height is reduced to 0.2 to 1 cm in a tension state when it is compressed or elongated.

Pad Weights

One of the object of the present invention is deliver a pad that is comfortable to be worn. The pad material is light-weighted. By doing so, the muscle enhancement device is not only comfortable to be worn also, when the muscle enhancement device is fixed to a garment, the weight of pad or gravity will not change the desired natural look of the fabric.

In one embodiment, the density of polymer foam is at about 18.53 kg/m$^3$. The weight of the pad is between 1.5 g to 5.5 g. In one example, the pad is an arm pad, configured to enhance a Bicep or tricep muscle, the weight of the pad is at 2.0802 grams. In another example, the pad is an oval pad, configured to enhance a posterior look, the weight of the pad is at 5.1740 grams. In still another example, the pad is a round pad, configured to enhance a posterior look, the weight of the pad is at 3.2265 grams. In yet another example, the pad is an irregular triangle pad, configured to enhance a should muscle, the weight of the pad is at 2.0042 grams. In a last example, the pad is an irregular rectangular shaped pad, configured to enhance a chest muscle, the weight of the pad is at 4.0260 grams.

Pad Curvature and Transitional and Diffused Edge

The novel pad, described herein, is made of a polymer foam, in particular, it is made of a polyurethane foam. The polyurethane foam is a porous material. Therefore, throughout the pad structure, the pad has pores.

Referring to cross-sectional views of the pads, each pad has a domed shaped cross-sectional view. There is a gradual transition in height from the center of the pad to the edge of the pad.

The edge in accordance with the aspects of the present invention, means a zone rather than a line. The edges in present invention is defined as 0.05 cm from the outmost periphery of the pad. Transitional edge in the present invention, means the edge zone having a continuous and gradual change in height in the areas from the extreme periphery to 0.05 cm away from the extreme periphery.

Referring to Figures, the transitional edge has a height of less than 1 cm. The transitional edge is characterized in that it has bigger pores and less pores than other areas of the pad, for example center of the pore.

Due to manufacturing process, in the step of stripping the emerged top of the polymer foam off from the mold, the pyramidal saw is used. During the cutting process, the pores of the edge of the pad are torn therefore some pores become half circle cavity and some pores are combined into a bigger pore, which, as a result, causes the edge have less integrated pores and more enlarged pores, as shown in microscopic view of the edge figures. The pores at reduced density and larger size, causes the edge of the pad to be compressed even more when pressure is applied, in another word, edge of the pad can be pressed to even thinner to become diffused edges, blended or embedded into the fabric with no pronounced interface.

Pad Tension States

The pad disclosed herein, have three distinctive states. A first state is a relaxed state, which means the pad does not entertain any stress. When the pad is made, the pad is in a stand lone relaxed state. A second state is a first degree tension state, which means the pad is compressed to a first degree. When the pad is merely compressed with no edge secured to the fabric and fabric is not elastic, the pad is in a first degree stress state. A third state is a second degree tension state, which means the pad is compressed to a second degree and elongated to a first percentage. When the pad is compressed and the fabric enclosing the pad also stretched to not only pressing the pad but also causing the pad to deform and elongated to a percentage, the pad is in the second degree tension state. Pad can recover to relaxed state from the first degree tension state and/or the second degree tension state when the pressure or force is released.

It is a tough balance to design a pad which has thin edges while the thin edges are still maintaining its integrity while being extended. The thickness is very carefully tailored to the tensile strength requirement and disappearing edges once the pad is sandwiched between two fabric.

Pad System-Muscle Enhancement Device

In accordance with the second aspect of the present invention, a pad system is described and disclosed. The pad system is meant to be enhance or supplement the muscle appearance of the person, therefore it is also referred as muscle enhancement device, but this purpose and function is for illustration purpose only, and it should not be construed as a limitation.

The pad system comprises two pieces of fabric, and the pad sandwiched between the two pieces of the fabric. The two pieces forms an enclosure for the pad. In one example, the pad is confined with the enclosure and can not move. In another example, there is still extra space for the pad to move in the compartment formed by the two pieces of the fabric but the due to the surface friction between the pad and fabric, the pad does not move with respect to the fabric in the pad system. In still another example, the pad is secured to the fabric through a fabric attachment method, for example, fusion, stitches or adhesion.

Typically, the two piece of fabric are made of the same fabric material with the same elasticity. However, in some rare example, the fabric uses as top piece and bottom piece can be different material compositions, in order to meet different requirement.

Fabric Composition

The fabric in the present invention is a blend of pure cotton and elastane. The weight % of elastane is about 3-20% with a (+/−3%) measurement error. In one example, the fabric composition includes 93% cotton and 7% elastane (+/−3%) as described herein. In another example, the fabric composition includes 81% cotton 19% elastane.

In accordance with the aspects of the present invention, the fabric used to form a muscle enhancement device is desired to an ability to bring the pad closer to the surface it is intended to adhere on, for example, a person's body. In another words, it is desired that the fabric has a certain degree of elasticity, in order to bring the pad closer to a person's body. When the fabric stretches, the pad is compressed, or compressed and elongated, the edge of the pad becomes disappeared in between the fabric.

In one preferred embodiment of the present invention, the fabric offers four-way elasticity, which means when it is stretched, it can be stretched equally in four directions. In one example, the fabric contains 81% cotton 19% elastane, having a density of (250 g/m2), so when the pad system is fixed on to a garment, it is configured to bring the pad closer to the body, making the pad more conformal to a wear's body shape, leaving a seamlessly edge.

In general, the more elastane is employed in the fabric composition, the more the pad tends to get closer to a user's body. However, the fabric composition is chosen according to the following portfolio of the properties, including yield (m·kg), pilling, width(meters), mass or density (g·m2), shrinkage (%), skewness (twist) %, fiber content %, elongation % and bursting strength. So that the garment having the pad system can sustain multiple wash and provide other desired properties as a garment.

The fabric properties are measured according to industrial norms, as the following.

Pilling is measured by ASTM D3512 STANDARD TEST METHOD FOR PILLING RESISTANCE AND OTHER RELATED SURFACE CHANGES OF TEXTILE FABRICS using RANDOM TUMBLE PILLING TESTER;

Width is measured by ASTM D3774 STANDARD TEST METHOD FOR WIDTH OF TEXTILE FABRIC;

Mass is measured by ASTM D3776 STANDARD TEST METHODS FOR MASS PER UNIT AREA (WEIGHT) OF FABRIC;

Shrinkage is measured by AATCC 135 DIMENTIONAL CHANGES OF FABRICS AFTER HOME LAUNDERING;

Skewness is measured by AATCC 179 SKEWNESS CHANGE IN FABRIC AND GARMENT TWIST RESULTING FROM AUTOMATIC HOME LAUNDERING;

Fiber Content is measured by AATCC20A FIBER ANALISIS: CUANTITATIVE

Elongation is measured by ASTM D2594 STANDARD TEST METHOD FOR STRECH PROPERTIES OF KNITTED FABRICS HAVING LOW POWER Bursting is measured by ASTM D3786 BURSTING STRENGTH OF TEXTILE FABRICS-DIAPRHAGM BURSTING STRENGTH TESTER METHOD Fabric Tension States The fabric employed in the present invention can go through stretched state and relaxed state inter-changeably multiple times. When fabric is in the stretched state, it makes the pad compressed and reduced in thickness. When fabric is in the relaxed state, the fabric is not stretched.

Zero-Finish Edge

One key aspect of the present invention is to provide a pad integrated system wherein the existence of the pad is almost undetected visually when the pad system is properly worn by the person. The undetected pad in the pad system is accomplished by making the edge of pad obscure and concealed in the fabric, which is referred as zero finish edge.

Zero finish edge of the pad system includes a porous transitional edge of the pad sandwiched in between two pieces of fabric. When the fabric stretches, porous transitional edge of the pad is placed under tension state and become compressed to create a zero-finished edge, which is obscure visually.

EXAMPLES

Referring to FIGS. 34-36, FIG. 34 shows an oval pad without being worn, between two layers of fabric, having a length or diameter of 16.5 cm, height or thickness of 1.6 cm and the edge has a thickness of 0.05 cm. FIG. 35 shows a view of the pad being worn between two layers of fabric, wherein the length or diameter has increased to 17 cm, the height or thickness has reduced to 1.45 cm and the edge has reduced thickness to 0.025 cm.

Referring to FIGS. 38-41, a round pad is measured to have a length at 16.5 cm and a height or thickness of 1.6 cm, at the relaxed state before it is worn. When the pad is being worn, the pad is changed to tension state, wherein the length of the pad has increased to 3-4% and the height or thickness of the pad has reduced to by 9-10%.

In one example, the pad is secured into an inside of the a garment chest area. For example the pad is placed in a pocket inside of the garment chest area. The pocket is formed by stitching. The stitching line is only visible in the interior of the garment. The pad is placed tightly in the pocket and will not move around. When the garment is not worn, the presence of the pad can be seen and edge of the pad can be easily identified. When the garment is worn properly, the garment will be stretched, the pad will be compressed and stretched at the same time. Consequently, the edges of pad are less and less pronounced due to stretch, become integrated.

In some example, a v neck collar is used to enhance the appearance of the garment. In one example, the zero finish pad is not secured onto the garment, but it is only confined in the pocket between two layers of fabric of the garment. In another example, the zero finish pad is secured onto the garment by sewing. When the fabric of the garment stretches, the pad is stretched and compressed to achieve a zero finish, even the edges are sewn.

Air Permeability

The air permeability for the exemplar pads of the present invention are also measured. The measurements were performed at 22.6 C and 66% HR. Big oval pad 206 has an average air permeability of 161 ft3/ft2/min, min air permeability of 74.3 ft3/ft2/min and max air permeability of 221 ft3/ft2/min. The big oval pad 206 has average pore size of 275 μm in the center, with 100.24 μm standard deviation. Shoulder pad 207, has an average air permeability of 272 ft3/ft2/min, min air permeability of 205.3 ft3/ft2/min and max air permeability of 379 ft3/ft2/min. The shoulder pad 207 has an average pore size of 157.54 μm and 90.15 μm standard deviation.

Pad Curvature Measurement

Figure 48:
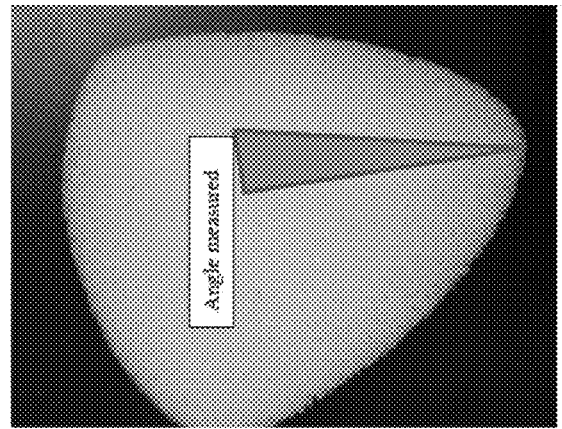
FIGS. 47 and 48 are illustrations on how the curvature angles are measured.
Figure 47:
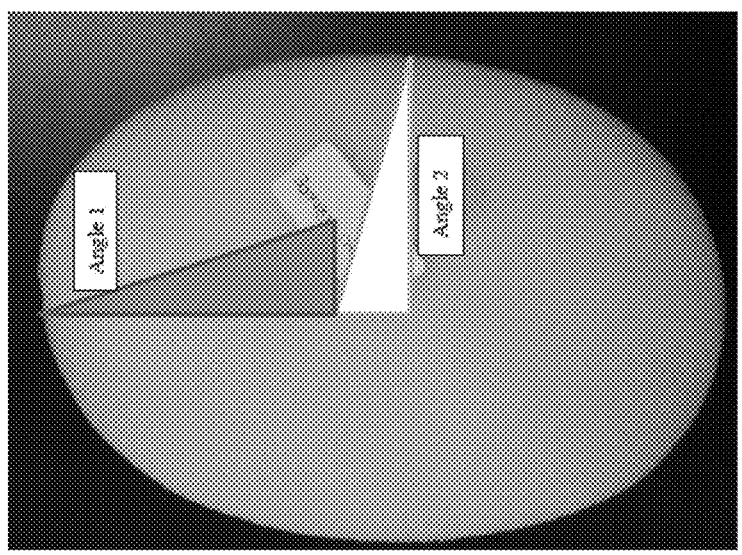

The angles of the pad curvature are measured as illustrated in FIGS. 47 and 48. One of the angles of Pad 206 is 7.15°, and another angles of Pad 206 is 10.45°. One angle of Pad 207 is at 9.4°

Manufacturing Process

On a third aspect of the present invention, a method to make the pad is disclosed. FIGS. 1-4 and FIGS. 37*a-e* illustrate two batches process to make pad in accordance with the aspects with the present invention.

The method comprises the following steps, providing a piece of polymer foam to be used to form a pad; providing a template having a cavity in a first shape; pressing the mold on to the polymer foam and applying pressure; forming a pad in the first shape when the foam emerges through the cavity of the mold; and cutting off the pad in the first shape along a flat surface of the mold using a saw.

Wherein the saw is a sharp pyramidal tooth ribbon saw. The saw moves in a speed at 1.45 m/sec. The saw has a cutting feature selected from 3 tpi, 4 tpi, 6 tpi, 10 tpi and 14 tpi, "tpi" is referred as "teeth per inch".

The saw can even be configured through a computing device to provide other surface features to the pad if needed.

Optionally, the method further includes use of a base support. The method further includes providing a slid surface and placing the foam on the solid surface.

Wherein the solid surface has a top surface with inclination so that when a foam pad is formed after emerged through the cavity of the plate, the pad can be asymmetric or having uneven thickness in one more direction.

The embodiments shown and described below are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

The invention claimed is:

1. A method to make a porous muscle enhancement pad for a garment, comprising
    making the porous muscle enhancement pad configured to be worn in a garment to enhance buttock area appearance and muscle groups selected from bicep, triceps and shoulder muscles,
    said pad is in a relaxed state when it is not worn, having a flat surface, an edge thickness of H, and edge zone length of L;
    and the porous pad is in a tension state when it is worn, having an edge thickness of Ht and edge zone length of Lt, wherein Ht is less than H and Lt is more than L; and the pad has a diffused edge in the garment;
    said pad having a tapered edge zone, surrounding a center portion of the porous pad, having a gradual decline in thickness from the center portion to a periphery of the porous pad;
    providing a piece of polymer foam to be used to form the porous muscle enhancement pad;
    providing a template having a hollow cavity in a first shape;
    pressing the mold on to the polymer foam and applying pressure;
    allowing the polymer foam emerge through the hollow cavity of the mold and forming an intermediate pad in a first shape; and
    cutting off the intermediate pad in the first shape along a flat surface of the mold using a saw and obtaining the porous muscle enhancement pad ready to be used for the garment.

2. The method of claim 1, wherein the saw is a sharp pyramidal tooth ribbon saw.

3. The method of claim 1, wherein the saw moves in a speed at 1.45 m/sec.

4. The method of claim 1, wherein the saw has a cutting feature selected from 3 tpi, 4tpi, 6tpi, 10 tpi and 14 tpi, and "tpi" is referred as "teeth per inch".

5. The method of claim 1, further comprising placing a solid support under the piece of polymer foam, wherein the solid support has an inclined surface.

6. The method of claim 1, wherein the cavity is selected from the shapes of irregular rectangle, round, oval, irregular Escutcheon, and irregular triangle.

7. The method of claim 1, wherein Ht is 9-10% less than H.

8. The method of claim 1, wherein Lt is 3-4% more than L.

* * * * *